Figure 1:
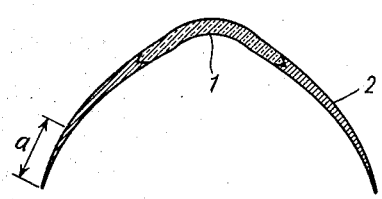

Sept. 6, 1938.  W. FEINBLOOM  2,129,304

CONTACT LENS

Filed April 6, 1936

INVENTOR
WILLIAM FEINBLOOM
BY Charles H. Brown
ATTORNEY

Patented Sept. 6, 1938

2,129,304

UNITED STATES PATENT OFFICE 2,129,304

CONTACT LENS

William Feinbloom, New York, N. Y.

Application April 6, 1936, Serial No. 72,970

4 Claims. (Cl. 88—54)

This invention relates to contact eye-glasses, hereinafter referred to as contact lenses, and more particularly to an improved contact lens and to an improved method of making same.

As is known, a contact lens is a small thin saucer-shaped glass placed under the eyelids in direct contact with the eyeball, and consists of two portions; namely, the corneal part which gives the desired correction for the eye, and the scleral rim which rests in immediate contact with the sclerotic or white of the eye. When used on the eyeball, the space between the cornea of the eye and the inner surface of the lens is filled with lachrymal secretion supplemented by saline solution used in inserting the contact lens under the eyelids, and it is this aqueous solution which acts as a fluid lens eliminating the action of the cornea.

The present development of contact lenses has thus far resulted in two types, one the ground lens, and the other the blown contact lens, both of which are made completely out of glass. In the ground lens, the corneal portion can be accurately controlled to provide any desired refractive correction. In the blown lens, the corneal portion is guessed at and the result is that the desired correction for myopia and hyperopia is only an approximate one. Consequently, there is a distinct disadvantage in using the blown contact lens. The optical requirements of the contact lens have been satisfactorily developed theoretically by a number of men, and no longer constitute an immediate problem. The part of the contact lens known as the scleral rim is what makes both of these types of present contact lenses, as well as others to be discussed later, unsatisfactory.

The scleral rim on the ground contact lens is spherical and therefore presumes that the eyeball is spherical. Since the ground contact lens itself has a contour of a circle, it is presumed that the cross-section of the eyeball, touched by the contour of the contact lens, is also a circle. Such, however, is unfortunately rarely the case. A mere inspection of the eyeball shows that its surface varies in curvature in the upper and lower quadrants, as well as in the nasal and temple quadrants.

When a ground spherical contact lens is placed on such an eyeball, it is found that there are points of contact where the lens presses too tightly against the globe, and then there are other areas where the lens is too loose and stays away from the globe.

This means that in a short while, the saline solution that must be held in place against the eyeball by the contact lens, will flow out from under the lens and leave an air bubble. The usual procedure in such instances is to hope that by persistent use of such a lens, the eyeball will gradually take the shape of the lens itself. This will sometimes happen to a more or less complete degree, due to the fact that every time the eyes are closed, the lids exert a certain pressure against the lens. While this may act favorably towards reshaping the eyeball into a spherical form, it results in certain edges where the contact lens originally pressed most, cutting into the sclera. This can readily be observed after the lens has been worn a few hours, since definite ridges may then be found in the sclera upon removal of the lens. This is a most unsatisfactory condition, because it definitely means increasing the interocular pressure within the eyeball, which is a dangerous thing.

In a great many cases, however, the eyeball will not readily conform to a sphere, even under persistent application of a spherical contact lens. In fact, after the patient has worn such a lens for a number of hours, it is found that the lens cannot be inserted again for several days because of the resulting tenderness following such prolonged pressure.

Another difficulty connected with the ground contact lens is that, for the most part, the lens fits by contact of the edge with the sclera (actually separated by a thin molecular layer of saline solution or tears). Therefore, even when the lens fits perfectly, its contact with the eye globe is only at the edge. This means that when the lens is worn for a long period, say, ten to fifteen hours, even in cases where it fits perfectly at the beginning, the edge is forced into the sclera, in tighter and tighter contact. While this invariably causes an increase in tenderness, it also introduces another disturbing element that the patient never fails to complain of; that is, the lens fills with oil.

To understand why this happens, we must recall that oil is constantly being secreted from the eyelids onto the eyeball, in order to lubricate the eyeball, and at the same time keep the lids from sticking together. Under ordinary conditions of use, this oil covers the eyeball with a very thin layer, so thin that it can only be observed under the microscope under special conditions. Ordinarily, this oil is washed away by the closing of the lids and disappears through the usual tear ducts into the nose.

If the patient is wearing a ground contact lens that fits perfectly, it will be found that during the first four or five hours the patient's vision is good, while at the end of that time the vision will be getting cloudy, after which, let us say at the end of six or eight hours, it is cloudier still. At this point, most patients have to take the lenses out of the eyes because of this cloudy condition, but there are others who persist in their use, suffering, however, a considerable reduction in vision for the remaining number of hours of use. When such a lens is finally taken out and examined, it is found to possess a fatty deposit which adheres to the lens and also to the cornea. This fatty or oily deposit is the oil secreted by the eye itself.

The reason that the oil remains under the lens after four or five hours is this: When the lens fits properly, it must be so fitted that it is loose enough for an exchange of tears and saline solution to occur. This will insure satisfactory removal of the oil under the lens, and at the same time insures the cornea being constantly washed with renewed tears (lachrymal secretion).

While the lens is worn for four or five hours, the constant pressure of the lids forces the edge of the ground contact lens to more firmly press against the globe. Finally, the contact is so firm that the tears can no longer flow under the lens, but the oil molecules, which are smaller, do come under the lens and are not washed away. We therefore have a small amount of tears under the lens becoming more and more saturated with oil.

Another difficulty that arises at this point is that the oil adheres to the cornea itself under the lens. At the end of four or six hours, when the lens is taken out, cleaned and then inserted in the eye again, the result is that the film or cloudiness still persists. The oil can adhere to the cornea much longer than it does to the glass, due to the fact that the cornea has not as highly polished a surface as the glass, and there are microscopic irregularities to which the oil can adhere. This will occur in some cases for as long as ten to twenty hours.

This means that in those cases where either the ground contact lens or the blown contact lens fits perfectly to begin with, difficulties will arise in at least two-thirds of the cases, due to this collection of oil. The reason for the collection of oil is that the edge of the lens rests against the globe and makes a tighter and tighter fit as time passes.

Some of the difficulties of the ground contact lens are partially overcome by the blown glass, but this lens in turn introduces new difficulties. The blown glass is made to fit the contour of the eyeball better than the ground glass, but this fit is only guessed at, so that it may be necessary to use a cut and try method, that is, to blow anywhere from ten to fifty lenses before a satisfactory contour is achieved. Even then the fit is only approximate.

Such a lens, of course, may not have a satisfactory corneal section, which introduces two problems in this type of lens, that of approximating the scleral contour, and that of approximating the necessary corneal curves. The volume in the blown contact lens is larger than in the ground contact lens, so that the collection of oil is not noticed quite as rapidly as in the ground contact lens. However, it definitely occurs, and for the same reasons mentioned in connection with the ground contact lens.

Other difficulties are caused by the fact that certain eyes are so irregular that the known type of contact lens can never be adapted. For instance, there are some eyes that have a scleratoconus, i. e., the sclera tends to form a cone just like the cornea does, or gives a high corneal astigmatism, where the sclera itself has developed a considerable astigmatism. In such cases, the ground spherical contact lens is useless, because it will touch the upper and lower part of the eye, for example, and extend away from the inner and outer part of the eye. This would result in the liquid running out from under the lens, or the lids would rub against the edge that protruded away from the eyeball, and become very much irritated.

In fact, in many of the cases where the ground, or even the blown contact lenses are tried, it is found that one or two spots, standing away from the globe by even as little as 0.25 mm., are sufficient to insure irritation of the lids.

It has hitherto been suggested that the rim of the contact lens be made from celluloid, but this is impractical since it is impossible to obtain the necessary suction between celluloid and the eyeball with the required thinness of celluloid. A very thin rim, of about one-half millimeter, such as required in contact lenses, when made of celluloid would cause the lens to warp and float around in the eye and permit the saline solution that must be held in place against the eyeball to flow out from under the lens.

The foregoing difficulties are overcome by the present invention which, among other things, provides a method of obtaining a mould of the eye and making the scleral rim of the contact lens fit the mould of the individual eyeball itself. The scleral rim is thus made to contact the sclerotic or white part of the eye, not at the contour only, but for an area along the scleral portion of possibly at least three or four millimeters. (The lens, of course, will be separated from the eyeball by a molecular layer of tears.) By means of the invention, there is thus obtained a lens whose edge will not sink into the eye globe despite continued use and pressure of the lids. The reason for this is that the pressure will be distributed over this whole three or four millimeter area and the sclera is far too rigid to be indented for an area of that extent.

By moulding the form of the scleral region of the lens in accordance with the invention, the lens is made to conform to the various irregularities that almost invariably exist in each eyeball. The actual separation desired of the lens from the eyeball is easily controlled through the process of so making the lens that, if a looser or tighter fit is required, all of the same curvature as the eyeball, it can readily be obtained in a manner described later. The reason for the possible requirement of a looser or tighter fit is that in certain corneal conditions (keratoconus and corneal scars), the lids secrete more oil than in the normal eye. This is in order to prevent the lids, which are somewhat irritated by these conditions, from sticking together.

By having a slightly looser fit, for example, it is possible to insure a more rapid exchange of tears under the contact lens, and so a more rapid removal of this oil film.

In making the contact lens of the invention, it is proposed to employ for the scleral rim a synthetic resin impervious to the fluids of the eye, such as Bakelite or a Bakelite composition of a type somewhat similar to that known to the dental trade as "Luxene". The resin may either be transparent or opaque, and if the latter may be dyed to give the appearance of the white of the eye. The moulded contact lens, in accordance with the invention, thus permits grinding away of very small quantities to obtain a desired fit even from the finished form, in the same way that a dentist, after taking an impression of an area of the mouth for a bridge and having the bridge made, may make final adjustments without having to resort to repeating the entire process.

In the process of making the contact lens of the invention, it is proposed to use a plastic from which the negative impression is made. One essential requirement of such a plastic is that it be capable of solidifying when in position on the eyeball and of moulding at a temperature slightly above body temperature. It will be appreciated, of course, that a temperature much higher than 102° F. may injure the cornea of the eye, and consequently the plastic should be capable of molding at a temperature at least as low as 102° F. Although numerous types of plastics may be found suitable, and it is not intended to limit the invention to any one material, one particular plastic which has been found to be satisfactory and is preferred is an elastic hydro-colloid composition known by the trade-name "Negocoll" which forms a thick paste upon being heated and which on cooling and solidifying has a soft rubber-like consistency. A characteristic of Negocoll is that it is non-irritating and easily sterilized by heating. Since this plastic forms no part of the present invention per se, and is well known in the literature on plastic reproductions, it will not be further described herein.

Figure 2:
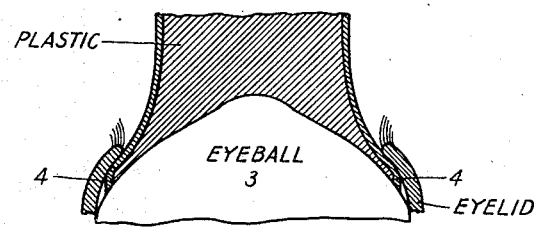
Figure 3:
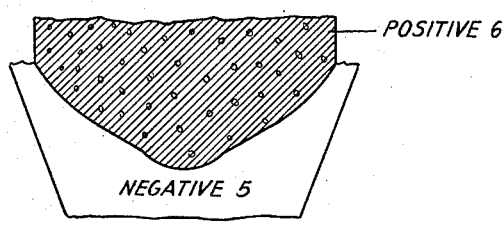
Figure 4:
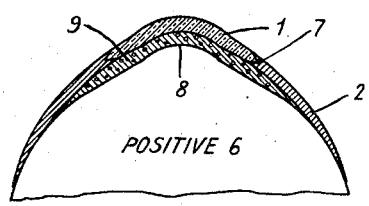

A more detailed description of the invention, accompanied by a drawing, follows, wherein:

Fig. 1 illustrates an enlarged view of a moulded contact lens made in accordance with the invention, and Figs. 2, 3 and 4 illustrate the steps involved in the process of making a moulded contact lens in accordance with the invention.

Referring to Fig. 1 of the invention, there is shown an improved contact lens made in accordance with the invention. This lens comprises a corneal portion 1, preferably made of glass and ground to give any desired refractive correction, and a scleral rim portion 2 made of a thin, rigid synthetic resin impervious to the fluids of the eye for holding the corneal part 1 in position. The rim 2 is made to fit a mould of an individual eyeball in a manner to be described more in detail later, and may comprise either a transparent or opaque material. The rim can thus be made to contact the sclerotic or white of the eye for a portion "a" whose area is possibly three or four millimeters. In one lens construction successfully made, the rim was made from a Bakelite composition known to the dental trade as "Luxene" except for the white dye.

The process of making a mould of the eyeball and a contact lens to fit the mould will now be described with particular reference to Fig. 2 which shows how the negative impression is obtained, and in conjunction with Fig. 3 which illustrates the manner in which the positive is made from the negative. Fig. 4 illustrates how the contact lens is constructed from the positive.

In making the negative impression of the eye, the individual eye 3 is first anesthetized. Then a suitable dam of wax or soft rubber 4 is made which will fit under the lids in such a way as to raise the lids off the globe 3, leaving a space between the dam 4 and the globe, into which the Negocoll plastic can flow.

Each of these dams 4 is made individually for each eye, in order to obtain the maximum sclera possible. The wax used is soft enough so that the edges of the plastic take the exact form of the eyeball after it has remained under the lids for one or two minutes.

The Negocoll is heated in a manner known in the art, melted and then allowed to cool while stirring, until it has reached a temperature of 105°. Then the tubular part of the dam is held in one hand and raised slightly so as to still further raise the lids approximately another one-half millimeter. With the other hand, the Negocoll may be picked up from the dish in a small spoon and poured into the opening of the dam. The patient, meanwhile, has been instructed to look with his other eye at a fixed point, which will insure keeping his eye steady and in the proper position.

The desired temperature of the Negocoll to touch the eye is about 102°, for it is still soft at this temperature and will take the form of the eye; on the other hand, it is not so hot that it will injure the tissues. Pouring at 105° will allow it to cool to 102° by the time it has flown through the dam and through the layer of tears into the eye. It may, if desired, be more desirable to flush the eye with cold water just prior to pouring in the Negocoll. This would insure a quicker setting of the Negocoll.

Two minutes after the Negocoll is poured, cold applications are placed over the dam now containing the Negocoll. This hastens the setting of the Negocoll. Since the temperature of the body remains at about 98° Fahrenheit, the Negocoll is allowed to set for five more minutes, so that all of it will adhere in one piece. Much quicker setting of the Negocoll can be obtained by applying very low temperatures to the Negocoll, for example, by the proper application of frozen carbon dioxide (dry ice) the setting time can be reduced to less than one minute.

The dam is constructed with perforations, to allow the Negocoll to flow into the perforations. Thus, when the dam is removed, it contains in it the Negocoll impression, and almost no Negocoll is left in the eye.

The eye is then washed with salt solution, and care is taken that no small traces of Negocoll are left in it. There are no after effects following this process. The negative thus obtained is shown as 5 in Fig. 3, and is hereinafter referred to simply as the negative.

From this negative a positive 6 is formed in known manner, using dental stone, although, of course, any other plaster or plastic might be used for this purpose.

The proper lens, which forms the corneal portion of the contact lens, is now selected and is preferably made of glass. The manner of the selection of this lens depends on the refraction of the eyeball, i. e., whether the patient is hyperopic or myopic, and also upon the initial curvature of the cornea as measured by an ophthalmometer. The exact technique for selection of this lens has previously been described by me in an article entitled "Contact lenses", published in Volume V of the "Transactions of the American Academy of Optometry", to which reference is herein made.

The lens which is indicated by numeral 1 in Fig. 4, will naturally have a different inner curve from that of the corneal curve 8 of the positive 6. It is important that the lens adhere to the positive mould 6 in such manner that no air spaces exist between the lens 1 and the mould 6, and this is achieved by building up the mould with stone 9 or other suitable material to the form of the lens, as shown in Fig. 4. This new built-up mould, consisting of the positive 6 together with the stone 9 but without the lens 1, is referred to hereinafter as the model.

One preferred way of making the contact lens will now be described, although it will be appreciated that this particular process may be deviated from. The lens 1 used for this purpose is now beveled both inside and outside in such a way as to allow the synthetic resin from which the rim 2 is made to flow under and over its edge a certain amount. (The amount should be approximately one millimeter all around.) Since it is desired that there be a clear area of glass approximately twelve millimeters in diameter (for the normal cornea it is approximately twelve millimeters in diameter), the lens 1 itself should be about fourteen millimeters in diameter, and should preferably be beveled at 7, as shown in Fig. 4.

The model must now be cut at the point where the new raised portion fits on the original positive. It must be cut in such a way that the bevel on the inner surface of the lens is left free and clear from the model itself. This will later allow the resin which forms the scleral rim of the completed contact lens to flow under the lens 1 just covering the bevel.

The glass lens 1 is removed and the model is now tinfoiled or metal plated with a metal which is as thin as possible. What is used now is tinfoil of the thickness of .0005", thus insuring only a minute departure of the inner curve of the finished contact lens from that of the eyeball, which is negligible. The tinfoil is very carefully burnished on to the model, and the lens 1 is then carefully cemented in proper position on the tinfoil.

After the foregoing operations, the model is waxed, i. e., a layer of wax is placed against the tinfoil covering the entire model, including the lens. The thickness of the wax used is determined by the desired thickness of the finished contact lens. The finished contact lens should be about one-half millimeter thick. However, since some grinding and polishing operation must precede the finished lens, it is preferred to use wax of one millimeter thickness, thus leaving one-half millimeter for grinding and polishing.

The wax is then removed from above the lens up to the bevel on the upper surface of the lens. This will later result in the resin flowing around the upper bevel on the lens, but not on the rest of the lens. The wax model with the lens in position is now tinfoiled again, i. e., the tinfoil is placed over the wax and the lens. The tinfoil used in this operation should be heavier, of the order of .001" thickness. The thickness of this upper layer of tinfoil is increased to prevent it from tearing when the plaster in the next step of operations settles on it.

The model with the lens, the first tinfoil layer, and overall covering tinfoil layer, is now invested in the lower part of a metal flask or container. Plaster is used for the investment, i. e., the plaster merely helps keep the model with the associated elements in place so that it will not move during the vulcanizing process, after the upper part of the flask is placed in position. A groove is cut in the plaster around the model, and this too is tinfoiled. The purpose of the groove is to act as a lock around the model, enclosing the model in an airtight chamber. This is necessary for vulcanization. The upper half of the flask is placed over this lower half, and the opening of the upper half removed, allowing plaster to be poured into the rest of the flask. This completely covers the tinfoil model and forms, as it were, an exact negative of the model. The flask is then covered and placed in boiling water for about ten minutes. This insures the wax being melted out, leaving a concavity around the model between the two layers of tinfoil. The flask is then separated in such a way as to expose the positive model in the lower half of the flask, and the negative model in the upper half. Both sides are cleaned with chloroform and washed with acetone. This insures cleanliness and dryness.

A sufficient amount of resin is then broken up and firmly packed around the positive model, care being taken not to get excess on the glass. The two halves of the flask are then placed together again under pressure to insure the resin filling all of the concavity. The flask is placed in the vulcanizer and vulcanized at a temperature of 244° Fahrenheit, for one hour and twenty minutes. The finished contact lens is then removed from the model, the tinfoil removed and the final grinding and polishing operations performed. The contour of the finished lens may be made any way that is desired, i. e., circular, oval, or, as is usually done, some irregular form. The finished contact lens must be beveled on its scleral edge in such a way that the lids cannot catch at the edge. The lens must also be very finely polished so that the lids coming over the edge will not be irritated.

It is to be distinctly understood that the invention is not limited to the foregoing method of constructing a finished contact lens from a mould of the eye, since other methods may be employed, and various steps outlined above deviated from. For example, if the grinding and polishing operation of the finished contact lens has made the inner surface too large for the eyeball, i. e., increased the radius, we may compensate for this by initially treating the negative. This treatment, for example, may comprise inserting a layer of wax of the required thickness over the negative impression so as to obtain a smaller positive. Nor is the invention limited to the method of vulcanizing the scleral rim onto the glass corneal portion of the contact lens, since, if desired, a baking process may be employed for hardening the resin onto the lens. Similarly, the invention is not limited solely to the use of a resin, although this is preferred, inasmuch as it is entirely possible to use other materials for the rim, such as enamel, porcelain and glass.

What is claimed is:

1. The method of manufacturing a contact lens which includes the steps of placing a sterilized, non-irritating plastic which is soft at 102° Fahrenheit on the eyeball at a temperature not appreciably greater than 102° Fahrenheit so as to cover the cornea and the white of the eye for a portion under the eyelids, permitting said plastic to harden and removing same when hardened, obtaining a positive from said hardened plastic, and making from said positive a rim of a synthetic resin for said contact lens, whereby said rim conforms with the shape of the white of said eyeball.

2. The method of manufacturing a contact lens which includes the steps of placing a non-irritating, sterilized plastic which is soft at a temperature of 102° Fahrenheit on the eyeball at a temperature insufficient to injure the eye so as to cover the white of the eye for a portion under the eyelids, permitting said plastic to harden and removing same after hardening, obtaining a positive from said hardened plastic, making from said positive a rim of a synthetic resin for said contact lens and forming said rim to securely hold a suitable glass corneal portion for said lens, whereby said rim conforms with the shape of the white of said eyeball.

3. The method of manufacturing a contact lens which includes the steps of placing a sterilized, non-irritating plastic which is soft at 102° Fahrenheit on the anesthetized eyeball at a temperature not appreciably greater than 102° Fahrenheit so as to cover the cornea and the white of the eye for a portion under the eyelids, permitting said plastic to harden and removing same when hardened, obtaining a positive from said hardened plastic, and making from said positive a rim of a synthetic resin for said contact lens, whereby said rim conforms with the shape of the white of said eyeball, and vulcanizing said rim.

4. The method of manufacturing a contact lens which includes the steps of placing a sterilized, non-irritating plastic which is soft at 102° Fahrenheit on the eyeball at a temperature not appreciably greater than 102° Fahrenheit so as to cover at least the white of the eye for a portion under the eyelids, permitting said plastic to harden and removing same when hardened, obtaining a positive from said hardened plastic, and making from said positive a rim of a synthetic resin for said contact lens, whereby said rim conforms with the shape of the white of said eyeball.

WILLIAM FEINBLOOM.